United States Patent [19]

Vinnemann et al.

[11] 3,912,862

[45] Oct. 14, 1975

[54] METHOD AND APPARATUS FOR PREPARING INFORMATION CARRIERS

[75] Inventors: Antonius Vinnemann, Stuttgart; Joachim Marz, Leinfelden; Dieter Lohse, Bonlanden, all of Germany

[73] Assignee: Franz Morat GmbH, Stuttgart, Germany

[22] Filed: Aug. 15, 1973

[21] Appl. No.: 388,448

[30] Foreign Application Priority Data

Aug. 18, 1972 Germany ............................ 2240688

[52] U.S. Cl. ..... 178/15; 235/61.12 N; 340/173 LM

[51] Int. Cl. ..... H04l 21/00; G11b 7/00; G06k 1/12

[58] Field of Search ................ 178/15, 30; 250/227; 340/173 LM, 173 LT; 235/61.12 N, 61.11 E, 61.12 R; 354/5; 346/107 R

[56] References Cited

UNITED STATES PATENTS

| | | | |
|---|---|---|---|
| 3,249,028 | 5/1966 | Higonnet et al. | 178/15 |
| 3,418,427 | 12/1968 | Jones | 178/30 |
| 3,422,219 | 1/1969 | Teeple, Jr. | 178/15 |
| 3,523,183 | 8/1970 | Silverman | 340/173 LM |
| 3,660,641 | 5/1972 | Levasseur | 235/61.12 N |
| 3,737,875 | 6/1973 | Fujimoto | 340/173 LM |

*Primary Examiner*—Thomas A. Robinson

[57] ABSTRACT

A method and apparatus for preparing an information carrier composed of a light-sensitive negative film material in which information of a binary character is applied to the carrier by controlling irradiation of specific areas of the carrier to form light transmitting areas and opaque areas all of which are separated by opaque barrier lines.

17 Claims, 6 Drawing Figures

METHOD AND APPARATUS FOR PREPARING INFORMATION CARRIERS

It is well known to use films, as well as magnetic and punched tapes, for the storage of information on materials in the form of strips. Such films are scanned in transmitted light and the information appears on them, in analogy with punched tapes, as transparent points on an opaque background, because in the opposite arrangement it is necessary that the surface area corresponding to an item of information should be greater than the cross-sectional area of the light beam used for scanning in order to avoid interference by stray light.

Representation of an item of information as a transparent point has the disadvantage that the scanning light beam must, at the moment of scanning, lie within the transparent point, which leads to close tolerances and to a minimum size for the surface corresponding to an item of information, this being determined by the limited response sensitivity of the photodiode. In order to eliminate this disadvantage the items of information are usually arranged on a grid and are, in addition, separated from each other, in the longitudinal and/or transverse directions of the film, in each case, by an opaque longitudinal and/or transverse cross-piece.

Such longitudinal or transverse cross-pieces, however, themselves introduce a further disadvantage. This consists of the circumstance that the information carrier must be prepared first as a negative and a positive must be made from it by a reverse development or a copying process. The reason for this is that by the first illumination of a normal negative material and subsequent development, dark points are produced only at those points corresponding to the items of information inserted, while at all remaining positions, corresponding either to a cross-piece or to a point at which no information is to be stored, a transparent region is produced. The necessary second process could certainly be avoided if a positive film material, such that illuminated positions would appear as transparent points after development, were used; but, up to the present, such a type of positive film material has not been obtainable with either the required sensitivity, or the required price.

Similar disadvantages and advantages arise when the items of information are again arranged on a grid, but as dark points. In this case, with normal input of information, dark points will be produced at those positions on the negative film material which correspond to items of information; but the cross-pieces will, as before, appear as transparent regions. This has the result that the information must first be recorded by inverse input and then, in this case also, a positive must be prepared from the negative produced.

The basic objection of the invention is to design a process and a device by means of which all the advantages of the negative film material are employed, while the disadvantage of the second illumination and/or development process can be avoided.

Starting from a method of preparing information carriers which employs radiation sensitive negative film material, which is irradiated in dependence on the items of information to be stored and subsequently developed in such a way that the items of information to be stored are separated from each other by opaque cross-pieces, the invention consists in that the negative film material is subjected to one irradiation and development process only since it is also irradiated on those positions which correspond to the cross-pieces.

The use of the method according to the invention leads, with normal input of information, to an information carrier in which the dark points correspond with the presence of an item of information, i.e. as a rule logic 1 data of information, and the transparent points with the absence of an item of information. A preferred further development of the invention may be characterised by the fact that irradiation takes place with an inverted input of information since, in this way, an information carrier is produced which, even in the first irradiation and development process, carries the logic 1 data of information as transparent points on a dark background.

The invention brings about the important advantage that the information carrier can be finished in a single irradiation and development process without the expense of the apparatus being increased in comparison with previous methods of preparation and without the necessity of deviating from those methods of use of negative film material which are usual at the present time.

The film may be irradiated in various ways. By the line-wise irradiation of the items of information it is possible for the irradiation of a line of information to take place either simultaneously with the irradiation of a neighbouring parallel transverse cross-piece and/or the longitudinal cross-pieces which run along the line of information items and which correspond to this item of information, or, also, to take place before or after the irradiation of the cross-pieces. The latter form of realisation includes the two further developments of the invention: that irradiation of a line of information occurs either with the use of spatially separated illuminating positions, or with the use of a single illuminating position which is controlled in a suitable manner. In all cases the negative film may be moved continuously or stepwise during irradiation and irradiation can be carried out with natural light.

A device for carrying out the method according to the invention, which includes an irradiating device which can be controlled in relation to the information and a device by means of which the negative film material can be moved either continuously or stepwise relative to the irradiating device is characterised, according to the invention, by the fact that the irradiating device includes a mask with at least one transverse slit arranged at right angles to the direction of motion, whose breadth corresponds to the breadth of a line of information and whose length corresponds at least to the length of a line of information, and irradiation organs by means of which the negative film material is irradiated throughout through the transverse slit.

In a possible embodiment, the length and breadth of the transverse slit may correspond exactly to the length and breadth of a line of information and the irradiation organ may be able to be controlled in such a way that the negative film material is irradiated, throughout, alternately through a selected region of the transverse slit and through the whole transverse slit. Another embodiment may be characterised by the fact that the length of the transverse slit corresponds to the sum of the length of a line of information and the length of a transverse cross-piece and that the irradiation organ can be controlled in such a way that, at each radiation step, the negative film material is irradiated throughout in dependence on the information through one part of the transverse slit and is totally irradiated throughout through the other part of the transverse slit. Finally, in a further embodiment, the mask may have two transverse slits, such that the length of one transverse slit corresponds with the length of a line of information and the length of the other transverse slit corresponds with the length of a transverse cross-piece, and a radiation organ is included which can be controlled in accordance with the information relative to the one transverse slit only.

The irradiation organ consists preferably of a light source which covers the whole breadth of the negative film material and a number of slides which, in their one position, cover the transverse slit at least partially, and, in their other position, leave it completely free. The movement of the slides takes place in dependence on the information and may conveniently be brought about, in each case, by means of a deflection vibrator.

The invention is more fully described in the following with reference to the attached drawings of examples of embodiment.

Figure 1:
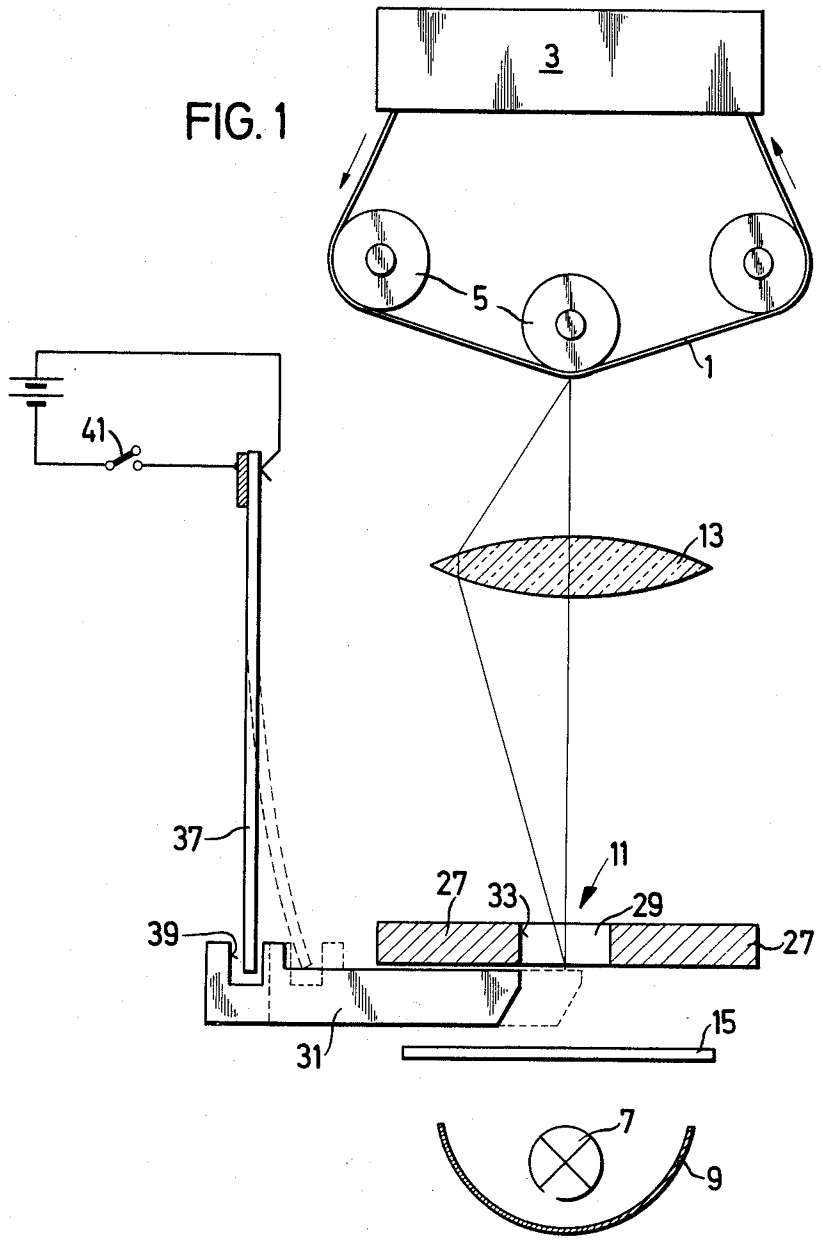
FIG. 1 shows schematically the side view of a first example of embodiment of the invention.
Figure 2:
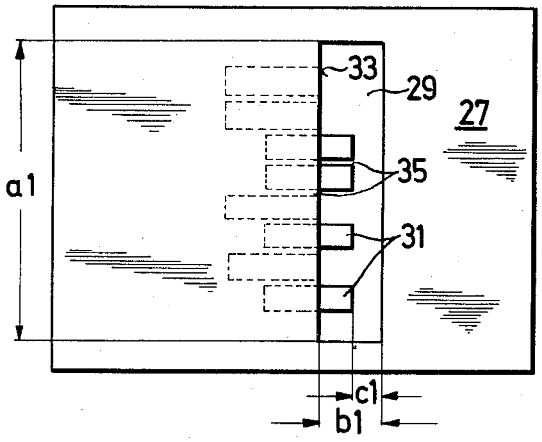
FIG. 2 shows schematically a plan view of some details of the example of embodiment according to FIG. 1.

The film strip 1, which consists of a negative film, and which is to be illuminated by the device of FIGS. 1 and 2, is placed in a cassette 3 and is transported, either step-wise or continuously, in front of an illuminating device by means of a number of driving or guiding rollers 5.

The illuminating device includes a pulse operated light source 7 with a reflector 9 which directs the bundle of light emitted by the light source through an optical shutter system 11 on to an optical system 13 which focusses the shutter system 11 on the film strip 1, in the required scale. A ground glass screen 15 may also be arranged between the shutter system 11 and the light source 7 to ensure uniform illumination of the shutter system.

Figure 3:
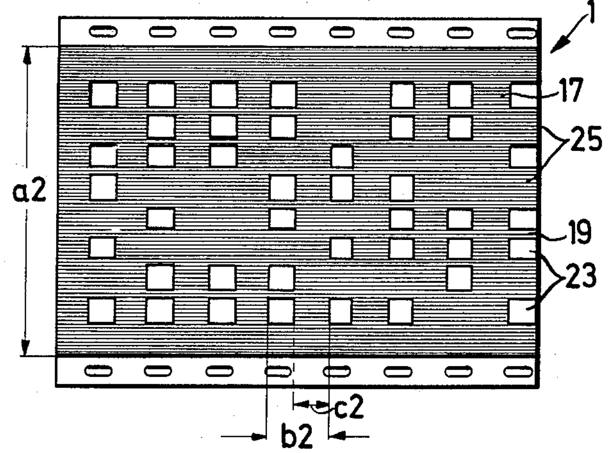
FIG. 3 is a plan view of an information carrier prepared by means of the device according to FIGS. 1 and 2.

The film strip 1, which is to be illuminated by the device according to FIGS. 1 and 2, should, after development, have the appearance as shown by FIG. 3, and, in particular, independent of the information stored, it should have a grid made up of opaque transverse crosspieces or barrier lines 17 and opaque longitudinal crosspieces or barrier lines 19, in which the longitudinal cross-pieces 19 are certainly narrower than the transverse cross-pieces 17 and may also be completely absent. After the finishing of the film strip 1, the grid itself is provided, in accordance with the programme, with transparent markings or areas 23 and opaque markings areas 25, such that the transparent markings 23 correspond, in normal input of information, to the logic 1 data of information, and in inverted output of information, to the logic 0 data of information (or vice versa).

The cross-pieces 17, 19 and the markings 23, 25 can be produced in a single illumination and development step by means of the apparatus according to the invention. For this purpose, the shutter system 11, according to FIGS. 1 and 2, has, as an important component, a mask 27 with a transverse slit 29 and a number of slides 31, which can be moved backwards and forwards in accordance with the items of information, and thus cover the transverse slit 29 in accordance with the programme. The slides 31, which move in, not illustrated, guides, are arranged closely adjacent to each other above or below, but preferably within the thickness of, the mask 27 in such a way that in the pushed back position they terminate together at the inner edge 33 of the transverse slit 29 and in their pushed forward position, on the other hand, they cover the transverse slit 29 about halfway, or, if necessary, somewhat more or less. Small longitudinal slits 35 may, if necessary, be provided between neighbouring slides 31 through which the film strip 1 may be illuminated throughout in the region of the longitudinal cross-pieces when all the slides 31 are pushed forward.

The total breadth $a1$ and length $b1$ of the transverse slit 29 and also the scale adjustment produced by the optical system 13 are chosen, in the embodiment according to FIG. 1, in such a way that, at each step of illumination, when the slides 31 are pushed back a section of the film strip 1 is illuminated whose breadth corresponds to the breadth $a2$ of a complete line of markings running in the transverse direction of the film strip, including all the longitudinal cross-pieces 19, and whose length $b2$ is equal to the sum of the lengths of a marking 23 or 25 and a corresponding, i.e. neighbouring, transverse cross-piece 17 in the longitudinal direction of the film strip. On the other hand, when the slides 31 are pushed forward, in accordance with the sample, then, at each step of illumination, all those parts of this section $a2 \times b2$ which correspond to the slides that are pushed forward, and thus the markings 23, remain unilluminated so that, after development, only those parts of the film strip which correspond to the areas of the transverse slit which were left free after the slides 31 were pushed forward in accordance with the sample will be dark or opaque.

Any known driving device, for example electromagnets, may be provided for moving the slides 31 forward and backward. According to the invention, however, one deflection vibrator 37 is used for each slide 31, one end of the said vibrator being clamped in a fixed position and the other end engaging, for instance, in a notch 39 in the rear end of the slide. Deflection vibrators in the sense of the invention include, for instance, bimetallic strips, multilayer electro- or magnetostrictive materials, and, in particular, the various natural or synthetic piezo-crystals among which the piezoelectric ceramic materials are especially suitable. In long term experiments multilayer piezo-electric deflection vibrators composed of certain alkaline earth titanates have proved satisfactory, by means of which with unilateral loading it is possible to achieve movements of several millimeters, which is sufficient for the movement of the slide 31. Deflection vibrators, in rod form, of barium titanate, lead-barium titanate, lead zirconate-titanate, or of compounds are preferably used and may, in general, be termed oxide ceramics. Also known are the so-called trilaminar piezo-oxides, which include two layers of ceramic and an intermediate layer of metal in order to improve the capacity for mechanical resistance, or the so-called multimorphic elements which are manufactured in one piece by extrusion press methods.

The deflection vibrator 37, shown schematically in FIG. 1, has, in general, an outer electrode at the clamped end which is connected to a battery through a suitable control switch 41, when it is desired to cause its free end to deviate. The control switch 41 consists, preferably, of an electronic control switch which, with normal information input, will be switched on for a preselected interval of time by each logic 1 data of information or, with inverted information input, by each logic 0 data of information, so that the corresponding slide 31 is in the pushed forward position during illumination.

The mode of operation of the device is as follows: after exact adjustment of the various components, the motor used to move the film strip 1 forward is switched on, the electronic control switch 41 is opened and closed by the application to its control input of the items of information to be stored, according to the programme, and pulses of illumination are led, in the correct cycle, to the light source 7. In this operation the signals conveyed to the control switch 41 and to the light source 7 are coordinated and synchronised with each other in such a way that, on the one hand, illumination of the grid takes place as described above and, on the other hand, the exchange of items of information, which causes the slide 31 to move into a different position, always occurs when the light source 7 is unilluminated. In this process signals derived from the transport of the film may be used to initiate a change of the item of information and for switching on the light source 7.

Figure 4:
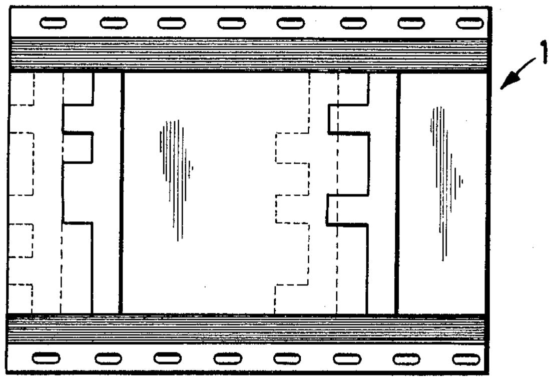
FIG. 4 shows schematically two different methods of illumination.

The forward movement of the film strip 1 which takes place in each illumination step corresponds exactly to the length $b1$ of the transverse slit 29. In order to make it unecessary to maintain close tolerances in the transverse slit, it is convenient to select for the length of that region of the transverse slit 29 which is covered by the slide 31, and thus for the length $b1 - c1$, a value somewhat greater than corresponds to one marking on the finished film strip, i.e. the length $b2 - c2$, while, in any case, the measurement corresponding to one transverse cross-piece, the length $c2$, must not be exceeded. In this way the length of the marking in the next illumination step will be reduced, by the length $c1$ of the tranverse cross-piece, to the previously chosen value. This is shown in FIG. 4, with the longitudinal cross-piece 19 omitted, the left-hand section of the Figure shows one method of operation, and the right-hand section shows the other method, the first illumination step being indicated by the full line and the second illumination step by the dotted line. In this way, it becomes unnecessary for the length $b1$ of the transverse slit 29 to correspond exactly to the length of the forward movement of the film taking place between two illumination steps.

In place of the pulse operated lamp it is possible to use a continuously operated lamp provided that the light path is interrupted, for instance by a rotating stop placed within the optical system 13, during the exchange of information items. In this case, with a continuous forward movement of the film, it is necessary that the time of opening of the stop should be short in comparison to the duration of one illumination cycle.

Figure 5:
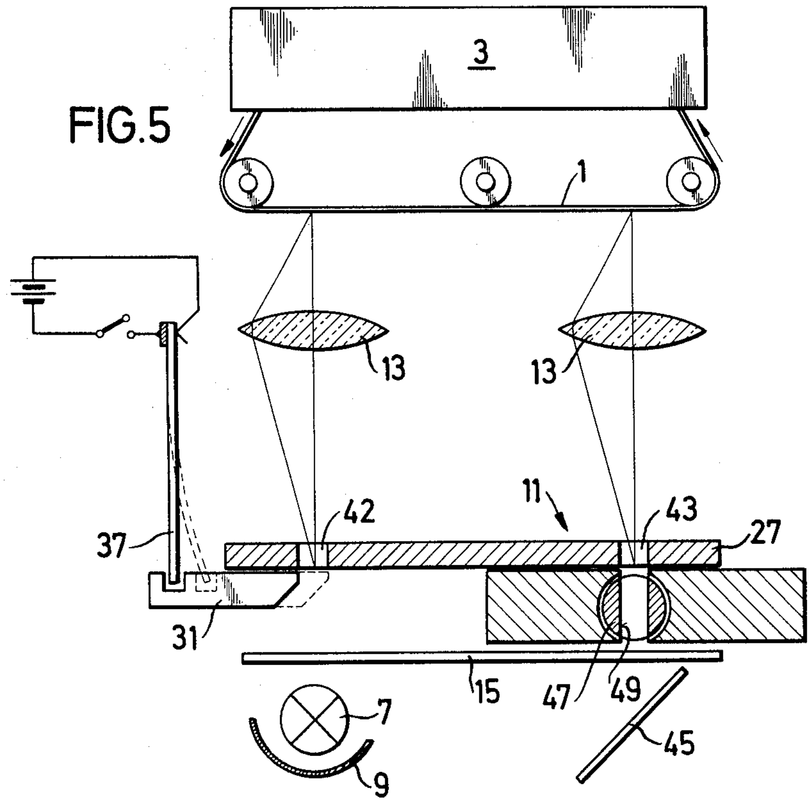
FIG. 5 is a partly cut-away side view of a second example of embodiment of the invention.

While in the embodiment illustrated in FIGS. 1 and 2, the information items and the cross-pieces are illuminated simultaneously and in the same place, in the example of embodiment illustrated in FIG. 5 the illumination takes place at different places, i.e. by means of two spatially separated lighting stations. For this purpose the mask 27 contains a transverse slit 42, which can be completely covered by the slides 31, and which serves to illuminate the items of information, and also a transverse slit 43, which is used only to illuminate the cross-pieces. Light from the pulse operated light source 7 is thrown simultaneously on to both transverse slits 42, 43 by means of a mirror 45 so that, at each illumination step, one line of information and one cross-piece are illuminated, but where the cross-piece, nevertheless, is not that immediately next to the information line which is formed at the same time but is separated from it. In this way an information line is formed, in relation to the direction of transport of the film strip, not only at a different place from the cross-piece immediately next to it; but also before or after the said cross-piece in the time sequence. A further example of embodiment of the invention arises from the device according to FIG. 5, with the transverse slit 43 and the mirror 45 omitted. It is, however, necessary in this form of embodiment to divide each illumination step into two half steps and, during the one half-step, to cover the transverse slit 42 by the slide 31, in dependence on the information, and, on the other hand, during the other half-step, to withdraw all slides 31, so that the film strip 1 is illuminated throughout through the uncovered transverse slit 42 to form a cross-piece 17. In this method of operation, cross-pieces 17 and lines of information are formed alternately at the same place in the device for illumination.

It has been assumed up to now that the film strip is transported stepwise and the light source is pulse operated. The invention is not, however, limited to such a working method, since the film may also, at choice, be transported continuously and the light source 7, also at choice, may be operated continuously. With stepwise transport of the film and continuous operation of the lamp it is necessary to provide a stop between the film strip 1 and the light source 7, which is opened only at the correct position of the slide 31 and at a stationary position of the film strip. A central stop of this type may, for instance, take the form of a rotating screen with a stop in the form of a slit, or of an additional slide, which, like slide 31 is moved forward and backward in the correct cycle and which, for instance, covers the whole transverse slit 29 in its forward position.

The film strip 1 is, however, preferably moved continuously so as to eliminate the inaccuracies produced by stepwise transport, which are due to the continually renewed engagement of the driving toothed wheel 5 with the edge perforations of the film strip 1. Unsharp regions at the front and rear edges of the markings and the transverse cross-pieces are certainly produced with continuous forward movement. However, these recording errors can, by a suitable choice of the speed of transport and the duration of illumination, be kept so small as to be negligible. For instance, if the speed of transport is 25 mm per second for 50 illuminations per second and the duration of illumination is 1 millisecond, a recording error of only 1/20 of the length of a marking or a transverse cross-piece is produced, which with a marking or cross-piece length of about 0.25 mm will cause no difficulty.

Finally, another form of embodiment is illustrated in FIG. 5, where both the illumination of the markings and the illumination of the transverse cross-pieces 17 are carried out with continuous operation of the light source 7. The markings are illuminated through the transverse slit 42, while, in order to illuminate the transverse cross-pieces, a rotating cylinder 47 is arranged between the mask 27 and the mirror 45 and has a transverse slit 49, corresponding in size to the transverse slit 43 and arranged below it when the cylinder 47 is in the position shown in FIG. 5. The cylinder turns in synchronism with the continuous transport of the film, half a rotation for each illumination step, so that, even with a continuously operated light source 7, the film can only be illuminated in the region of the transverse cross-piece 17.

Figure 6:
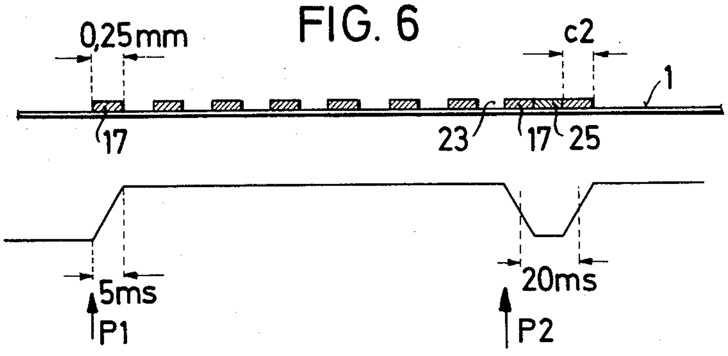
FIG. 6 shows schematically the time interval, during which a change of information can be carried out when the device according to FIG. 5 is used.

FIG. 6 shows that with continuous forward movement of the film and continuous operation of the light source 7, and using the embodiment according to FIG. 5 in the last described method of operation, the slide 31 is always controlled so as to operate at the same time interval at which an area of the film strip 1 occupied by a transverse cross-piece is in position over the transverse slit 42. Since this change of information can occur very rapidly, e.g. within 5 milliseconds, and the length $c2$ (FIG. 3) in the example given above corresponds to a time interval of 10 milliseconds, the tolerances are still sufficiently great when the change in position of the slide is initiated at the points in time shown by the arrows P1 and P2. As in all other forms of embodiment, this method of operation is independent of the direction in which the film strip 1 is transported, i.e. whether an information line first and then a corresponding transverse cross-piece 17, or, with the opposite arrangement, first a transverse cross-piece and then the neighbouring line of markings are illuminated in the direction of transport.

The invention is not limited to the examples of embodiment described, but can be varied in numerous ways. Thus it is not, for instance, necessary to carry out the illumination of the markings according to the sample by means of a single light source 7 and a number of slides 31. It is rather possible that as many individual light sources are there are lines of markings should be projected on to a line running transverse to the film strip 1, for instance, by means of light-emitting diodes or bundles of glass fibres, and that these light sources should be directly controlled in dependence on the items of information. This possibility can also arise when each step of illumination consists of two half-steps and the markings are illuminated in the one half step while, in the other half step, the transverse cross-piece is illuminated.

Further, the invention is not limited to the preparation of predetermined grids, but can be used with advantage in all cases in which the positions on a film which can be occupied by markings are to be separated by surfaces of a grid type. For example, it would be possible in the form of embodiment of FIG. 5 to provide a third illumination station to produce the longitudinal cross-piece 19.

Finally, the invention is also suitable for the illumination of colour films where, for instance, each marking is formed by means of three different projection systems and thus appears after illumination, in each case, as a primary colour (red, green, blue), a mixed colour (yellow, turquoise, violet), or white. Colour films of this type might be suitable in the field of knitting or weaving machinery for the electronic control of machines, where each marking must contain, not only information concerning the colour of a thread, but also information concerning the linkage (for instance knitting or catching in the knitting machine).

Preferably, a continuous and automatically operating developing device is arranged subsequent to the device, according to the invention, for the illumination of the film strip in such a way that the film strip is not only illuminated in the required manner within the single automatic operation but is also developed, so that no additional stages are necessary for the rerolling and development of the film strip.

Any radiation sensitive material such that a permanent alteration, with opposite values of brightness or complementary colours with respect to the image, can be produced by focussing an image on to the material by means of a suitable radiation and a suitable projection system is suitable as the material of the negative film. Any known electromagnetic or corpuscular radiation, in particular, however, visible light, may be considered as the type of radiation to be employed.

We claim:

1. A method of preparing an information carrier storing information represented by light transmitting areas and opaque areas, said areas being applied in a plurality of first spaced parallel lines and in a plurality of second spaced parallel lines crossing said first lines; comprising the steps of irradiating a carrier of sensitive negative film material; controlling said irradiation such that selected areas on said film material are irradiated or non-irradiated in accordance with said information to be stored thereon; irradiating the spaces between each of the parallel first lines; and developing said film material to form opaque areas and light transmitting areas in said first and second lines and to form first opaque barrier lines between said first spaced lines.

2. A method according to claim 1, wherein said first spaced lines are rectilinear and extend in a first direction and wherein said second spaced lines are rectilinear and extend in a second direction.

3. A method according to claim 1, wherein the irradiation of selected areas of a complete first line takes place, in time, simultaneously with the irradiation of at least one barrier line.

4. A method according to claim 1, wherein irradiation of selected areas of a complete first line, takes place, in time, before or after the irradiation of at least one carrier line.

5. A method according to claim 1, wherein the irradiation of selected areas of a complete first line, is carried out simultaneously.

6. A method according to claim 1, wherein the spaces between each of the parallel second lines are irradiated to from second opaque barrier lines between said second spaced lines.

7. A method according to claim 4, wherein the irradiation of said first lines and of said first barrier lines is carried out by means of spaced irradiating stations and wherein said film material is moved past said irradiating stations for successively forming said first lines and said barrier lines.

8. A method according to claim 3, wherein the irradiation of said first lines of information areas and said first barrier lines is carried out by means of one irradiating station and wherein said film material is moved past and irradiating station for alternately forming a first line of information and a first barrier line.

9. Apparatus for preparing an information carrier storing information represented by light transmitting areas and opaque areas, said areas being applied in a plurality of first spaced parallel lines and in a plurality of second spaced parallel lines crossing said first lines, said first spaced lines being spaced by first opaque barrier lines, comprising: an irradiation device including a mask with a first slit extending parallel to said first spaced lines, the length and the width of said slit corresponding at least to the length and the width of a complete first line of information areas; means for transporting a carrier composed of sensitive negative film material relative to said irradiation device in a direction parallel to said second spaced lines of information areas; and irradiation device including first irradiating means for irradiating said film material through said first slit such that during every irradiation step a complete first line of said film material is irradiated in accordance with the information to be stored, and second irradiating means for irradiating the spaces between each of the first spaced lines so as to form said first barrier lines.

10. Apparatus according to claim 9, wherein said first and second lines of information areas extend at right angles to each other, said first lines extending transversely of and said second lines extending longitudinally of said information carrier.

11. Apparatus according to claim 9, wherein the width of said first slit corresponds to the width of a first line of information areas and wherein said first and said second irradiating means include said first slit and means for controlling said first and second irradiation means such that the negative film material is irradiated alternately through selected parts of said first slit and through the entire first slit for alternately applying first lines of information areas and first barrier lines therebetween.

12. Apparatus according to claim 9, wherein the width of said first slit corresponds to the sum of the width of a first line of information areas and the width of a first barrier line and wherein said first and said second irradiating means include said first slit and means for controlling said first and second irradiating means so that the negative film material is irradiated in accordance with the information to be stored through selected parts of one portion of the slit and is totally irradiated through another portion of the slit for simultaneously applying a first line of information areas and an adjacent barrier line.

13. Apparatus according to claim 9, wherein said first irradiating means includes said first slit and wherein said second irradiating means includes a second slit, said second slit extending parallel to said first slit and corresponding in length and width with the length and width of a first barrier line; and wherein said first and said second irradiating means include means for controlling said irradiating means so that said negative film material is irradiated through both of said slits for applying simultaneously, a first line of information areas and a first barrier line at different positions on said negative film material.

14. Apparatus according to claim 9, wherein said first and second irradiating means include a light source extending over the length of a first line of information areas, said first irradiating means further includes a number of slide members which, in one position, cover said first slit at least in part in the direction of said second lines of information areas, and which in the other position leave the first slit completely uncovered.

15. Apparatus according to claim 14, wherein said first irradiating means further includes piezoelectric ceramic deflection elements of the bender-type for controlling movement of said slides in accordance with the information to be stored.

16. Apparatus according to claim 14, wherein said slides are spaced in the direction of said first lines of information areas so as to form between every two areas of a first line of information areas a portion of a second barrier line.

17. Apparatus according to claim 9, further comprising an automatic developing device positioned behind said irradiation device in the direction of said second lines of areas for automatically developing said negative film material irradiated by said irradiating device.

* * * * *

UNITED STATES PATENT AND TRADEMARK OFFICE

CERTIFICATE OF CORRECTION

PATENT NO. : 3,912,862

DATED : October 14, 1975

INVENTOR(S) : Antonius Vinnemann et al.

It is certified that error appears in the above-identified patent and that said Letters Patent are hereby corrected as shown below:

Claim 8, line 1, change "3" to --4--

Signed and Sealed this

*twentieth* Day of *April 1976*

[SEAL]

*Attest:*

RUTH C. MASON
*Attesting Officer*

C. MARSHALL DANN
*Commissioner of Patents and Trademarks*

UNITED STATES PATENT OFFICE

CERTIFICATE OF CORRECTION

Patent No. 3,912,862 Dated October 14, 1975

Inventor(s) Antonius Vinnemann et al.

It is certified that error appears in the above-identified patent and that said Letters Patent are hereby corrected as shown below:

Claim 8, line 1, change "3" to -- 4 --.

Claim 8, line 5, "and" to -- said --.

This certificate supersedes Certificate of Correction issued April 20, 1976.

Signed and Sealed this

Thirteenth Day of July 1976

[SEAL]

*Attest:*

RUTH C. MASON
*Attesting Officer*

C. MARSHALL DANN
*Commissioner of Patents and Trademarks*